US010356634B2

(12) United States Patent
Kubota

(10) Patent No.: US 10,356,634 B2

(45) Date of Patent: Jul. 16, 2019

(54) BASE STATION, COMMUNICATION SYSTEM, COMMUNICATION METHOD AND STORAGE MEDIUM

(71) Applicant: NEC Corporation, Tokyo (JP)

(72) Inventor: Mitsuhiro Kubota, Tokyo (JP)

(73) Assignee: NEC Corporation, Tokyo (JP)

( * ) Notice: Subject to any disclaimer, the term of this patent is extended or adjusted under 35 U.S.C. 154(b) by 419 days.

(21) Appl. No.: 14/352,654

(22) PCT Filed: Oct. 29, 2012

(86) PCT No.: PCT/JP2012/078548

§ 371 (c)(1),
(2) Date: Apr. 17, 2014

(87) PCT Pub. No.: WO2013/065857

PCT Pub. Date: May 10, 2013

(65) Prior Publication Data

US 2014/0315558 A1 Oct. 23, 2014

(30) Foreign Application Priority Data

Nov. 1, 2011 (JP) ................................ 2011-240398

(51) Int. Cl.
*H04W 24/02* (2009.01)
*H04W 36/00* (2009.01)
(Continued)

(52) U.S. Cl.
CPC ....... *H04W 24/02* (2013.01); *H04W 36/0083* (2013.01); *H04W 16/32* (2013.01); *H04W 84/045* (2013.01)

(58) Field of Classification Search
CPC ... H04W 36/04; H04W 84/10; H04W 84/105; H04W 36/001; H04W 84/045; H04W 36/0061; H04W 24/02; H04W 16/32; H04W 36/0083; H04W 36/08; H04W 72/0426; H04W 92/20
See application file for complete search history.

(56) References Cited

U.S. PATENT DOCUMENTS 7,623,866 B1 11/2009 Spitzer
8,385,918 B2 2/2013 Hashimoto
(Continued)

FOREIGN PATENT DOCUMENTS

EP 2 373 093 A1 10/2011
JP 2008-153963 A 7/2008
(Continued)

OTHER PUBLICATIONS

Extended European Search Report dated Jun. 15, 2015.
International Search Report (ISR) (PCT Form PCT/ISA/210), in PCT/JP2012/078548, dated Dec. 11 , 2012.

*Primary Examiner* — Nam Huynh
(74) *Attorney, Agent, or Firm* — McGinn IP Law Group, PLLC

(57) ABSTRACT

A base station includes: a reception unit for receiving a first adjacent cell list which is a list of cells adjacent to a cell managed by an adjacent base station from the adjacent base station; and a control unit for employing the first adjacent cell list as a second adjacent cell list that is a list of cells adjacent to a cell managed by the base station itself.

10 Claims, 12 Drawing Sheets

(51) Int. Cl.
*H04W 16/32* (2009.01)
*H04W 84/04* (2009.01)

(56) References Cited

U.S. PATENT DOCUMENTS

| | | | | |
|---|---|---|---|---|
| 2007/0097938 | A1* | 5/2007 | Nylander .......... | H04L 29/12066 370/338 |
| 2009/0052418 | A1* | 2/2009 | Semper ................. | H04W 24/02 370/338 |
| 2009/0059867 | A1* | 3/2009 | Rajasimman ......... | H04W 16/32 370/332 |
| 2010/0323699 | A1 | 12/2010 | Hashimoto | |

FOREIGN PATENT DOCUMENTS

| | | | |
|---|---|---|---|
| JP | 2011-4101 | A | 1/2011 |
| WO | WO 2010/075990 | A1 | 7/2010 |
| WO | WO 2010/146785 | A1 | 12/2010 |

* cited by examiner

Fig.5

ADJACENT CELL LIST

| CELL NUMBER | THE NUMBER OF TIMES OF HANDOVER |
|---|---|
| #a | 10000 |
| #b | 5000 |
| #c | 3000 |
| #d | 2500 |
| #f | 2000 |
| #e | 1000 |
| ... | ... |
| ... | ... |

Fig. 10

| CELL NUMBER | THE NUMBER OF TIMES OF HANDOVER | RATE OF FAILURE OF HANDOVER |
|---|---|---|
| #a | 10000 | 30% |
| #b | 5000 | 7% |
| #c | 3000 | 3% |
| #d | 2500 | 20% |
| #f | 2000 | 15% |
| #e | 1000 | 6% |
| ... | ... | ... |
| ... | ... | ... |

BASE STATION, COMMUNICATION SYSTEM, COMMUNICATION METHOD AND STORAGE MEDIUM

TECHNICAL FIELD

The present invention relates to a base station, and a communication system, a communication method and storage medium related to a base station.

BACKGROUND ART

A relay base station of a mobile network specified in 3GPP (3rd Generation Partnership Project) is connected with a base station (it is called a Donner eNodeB or DeNB) via a Un link. DeNB transmits data between a core network and the relay base station via S11 link.

The mobile network is mainly formed by macro base stations. Because coverage ("macro cell") of the macro base station is set widely, the number of base stations to be installed has been small. However, heavy users who frequently perform the Internet connection are increasing in these days. On the other hand, in the case of the boundary region of the macro cells, the inside of the building, and the underground, etc., radio field strength is inevitably weak and communication is very difficult. Requests for improvement in such situation have been received from the above-mentioned heavy users. The communication common carriers are dealing with the requests by installing a small size base station of a cell smaller than a macro cell (a pico base station and a relay base station, for example).

However, along with increase in the number of base stations, the number of cells adjacent to one cell increases. Accordingly, it is difficult to create an adjacent cell list manually, and thus there is a need to adopt a technology described below for establishing the adjacent cell list automatically at the time of such as additional installation of a cell.

Here, the adjacent cell list is a list to be referred to by a mobile terminal that exists in a cell in an idle state when the mobile terminal determines a move destination cell. That is, it can be said that the adjacent cell list of a certain cell is a list of cells adjacent to the certain cell. Moreover, the adjacent cell list is referred to when a mobile terminal existing in a cell is in a RRC (Radio Resource Control) Connected state and a base station determines a handover destination cell. Generally, the adjacent cell list is informed in the cell by the base station.

A priority of the cell in the adjacent cell list is generally determined based on the number of times of execution of handover and a rate of failure of handover. For example, the higher priority is given to the adjacent cell with large number of times of execution of handover and with small rate of failure of handover. A cell to which a handover has not been occurred even if the cell has been added to the adjacent cell list, and a cell which tends to fail in handover while there is much number of times of handover are eliminated at the time of the next update of the adjacent cell list.

As mentioned above, the pico base station and the relay base station are small in scale compared with the macro base station. Therefore, in the pico base station and the relay base station, since cell to be selected as a handover destination is limited, it is difficult to obtain sufficient statistical information. Therefore, in the pico base station and the relay base station, there is a problem that the most suitable adjacent cell list cannot be created.

As an algorithm which realizes optimization of an adjacent cell list, there is ANR (Automatic Neighbor Relation). However, because many of ANR algorithms require a large calculation load to the base station, ANR is unsuitable for the pico base station and the relay base station that have small processing power.

As another technology which creates a most suitable adjacent cell list, a patent document 1 and a patent document 2 are cited. In the patent document 1, there are disclosed a maintenance server which collects information from each base station and transmits information to an optimization terminal, and the optimization terminal which optimizes the adjacent cell list based on the received information.

In the patent document 2, there is disclosed a technology about optimization of the adjacent cell list when newly installing the base station. First, the base station to be installed newly transmits a new installation notification to an adjacent base station. The base station which has received the notification returns a reply when the distance from the base station to be installed newly is below a threshold value. The base station to be installed newly creates a most suitable adjacent cell list by receiving such replies and listing the base stations in the adjacent cell list sequentially in the order of the distance from the shortest to the longest.

CITATION LIST

Patent Document

[Patent document 1] Japanese Patent Application Laid-Open No. 2008-153963

[Patent document 2] Japanese Patent Application Laid-Open No. 2011-004101

SUMMARY OF INVENTION

Technical Problem

However, in the case of the method indicated in the patent document 1, frequent communication is carried out among the base station, the maintenance server and the optimization terminal. For example, the base station transmits statistical information to the maintenance server periodically. Accordingly, when the adjacent cell list is created in the method like that shown in the patent document 1, there is concern that communication traffic of the network increases.

In the case of the patent document 2, because the new installation notification is transmitted to the adjacent base stations from the base station to be installed newly by multicasting, there is concern that communication traffic at the time of creating the adjacent cell list is increased.

An object of the present invention is to provide a base station, a communication system, a communication method and a storage medium that are capable of creating the adjacent cell list without increasing communication traffic.

Solution to Problem

A base station of the present invention includes: a reception means for receiving a first adjacent cell list from an adjacent base station, the first adjacent cell list being a list of cells adjacent to a cell managed by the adjacent base station; and a control means for employing the first adjacent cell list as a second adjacent cell list, the second adjacent cell list being a list of cells adjacent to a cell managed by said base station itself.

A communication system of the present invention is a communication system having a plurality of base stations, and at least one base station among the plurality of base stations includes: a reception means for receiving a first adjacent cell list from an adjacent base station, the first adjacent cell list being a list of cells adjacent to a cell managed by the adjacent base station; and a control means for employing the first adjacent cell list as a second adjacent cell list, the second adjacent cell list being a list of cells adjacent to a cell managed by said base station itself.

A communication method of the present invention: receives a first adjacent cell list from an adjacent base station, the first adjacent cell list being a list of cells adjacent to a cell managed by the adjacent base station; and employs the first adjacent cell list as a second adjacent cell list, the second adjacent cell list being a list of cells adjacent to a cell managed by said base station itself.

A storage medium of the present invention records a program for making a computer of a base station carry out: processing for receiving a first adjacent cell list from an adjacent base station, the first adjacent cell list being a list of cells adjacent to a cell managed by the adjacent base station; and processing for employing the first adjacent cell list as a second adjacent cell list, the second adjacent cell list being a list of cells adjacent to a cell managed by said base station itself.

Advantageous Effects of Invention

The adjacent cell list can be created without increasing communications traffic.

BRIEF DESCRIPTION OF DRAWINGS

FIG. 5 is a diagram which indicates an example of an adjacent cell list stored in a memory unit of the pico base station.

FIG. 10 is a diagram which indicates an example of statistical information handled by the base station in the second exemplary embodiment.

DESCRIPTION OF EMBODIMENTS

Hereinafter, exemplary embodiments of the present invention will be described with reference to a drawing.

First Exemplary Embodiment

Configurations

Figure 1:
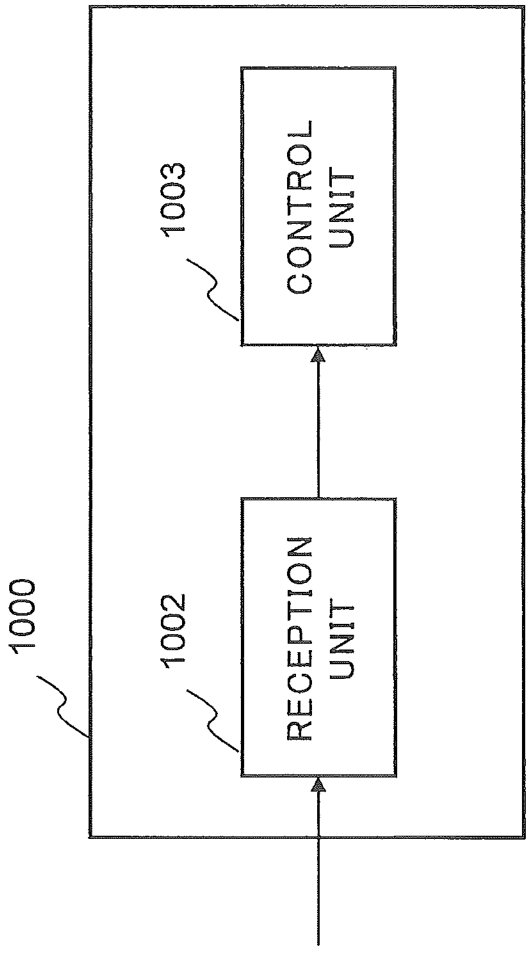
FIG. 1 is a block diagram indicating an exemplary configuration of a base station of a first exemplary embodiment.

FIG. 1 is a diagram which indicates an exemplary configuration of a base station 1000 of the first exemplary embodiment of the present invention. The base station 1000 includes a reception unit 1002 and a control unit 1003. The base station 1000 is managing a cell.

The reception unit 1002 receives a first adjacent cell list that is a list of cells adjacent to a cell managed by an adjacent base station from the adjacent base station. The control unit 1003 uses the first adjacent cell list received as a second adjacent cell list that is a list of cells adjacent to a cell which the base station 1000 manages.

[Operations]

Figure 2:
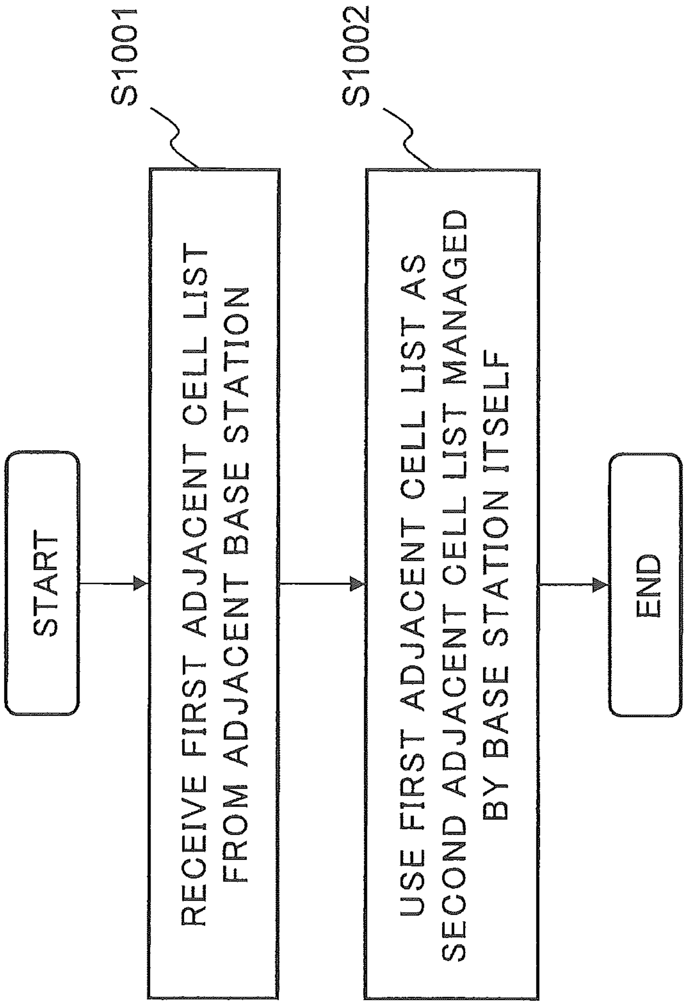
FIG. 2 is a flow chart which indicates an example of operations of a base station of the first exemplary embodiment.

FIG. 2 is a flow chart showing an example of operations of the base station 1000 of the first exemplary embodiment. The reception unit 1002 receives the first adjacent cell list from the adjacent base station (Step S1001). The control unit 1003 uses the first adjacent cell list received as the second adjacent cell list that is the list of cells adjacent to the cell which the base station 1000 manages (Step S1002).

[Effects]

In the first exemplary embodiment described above, communication performed between the base station 1000 and the adjacent base station at the time of creating the second adjacent cell list that is the list of cells adjacent to the cell managed by the base station 1000 is fundamentally only reception of the first adjacent cell list. Therefore, frequent communication like that shown in the patent document 1 and the patent document 2 is unnecessary. That is, according to the first exemplary embodiment, the adjacent cell list can be created without increasing communication traffic.

Second Exemplary Embodiment

Configurations of System

Figure 3:
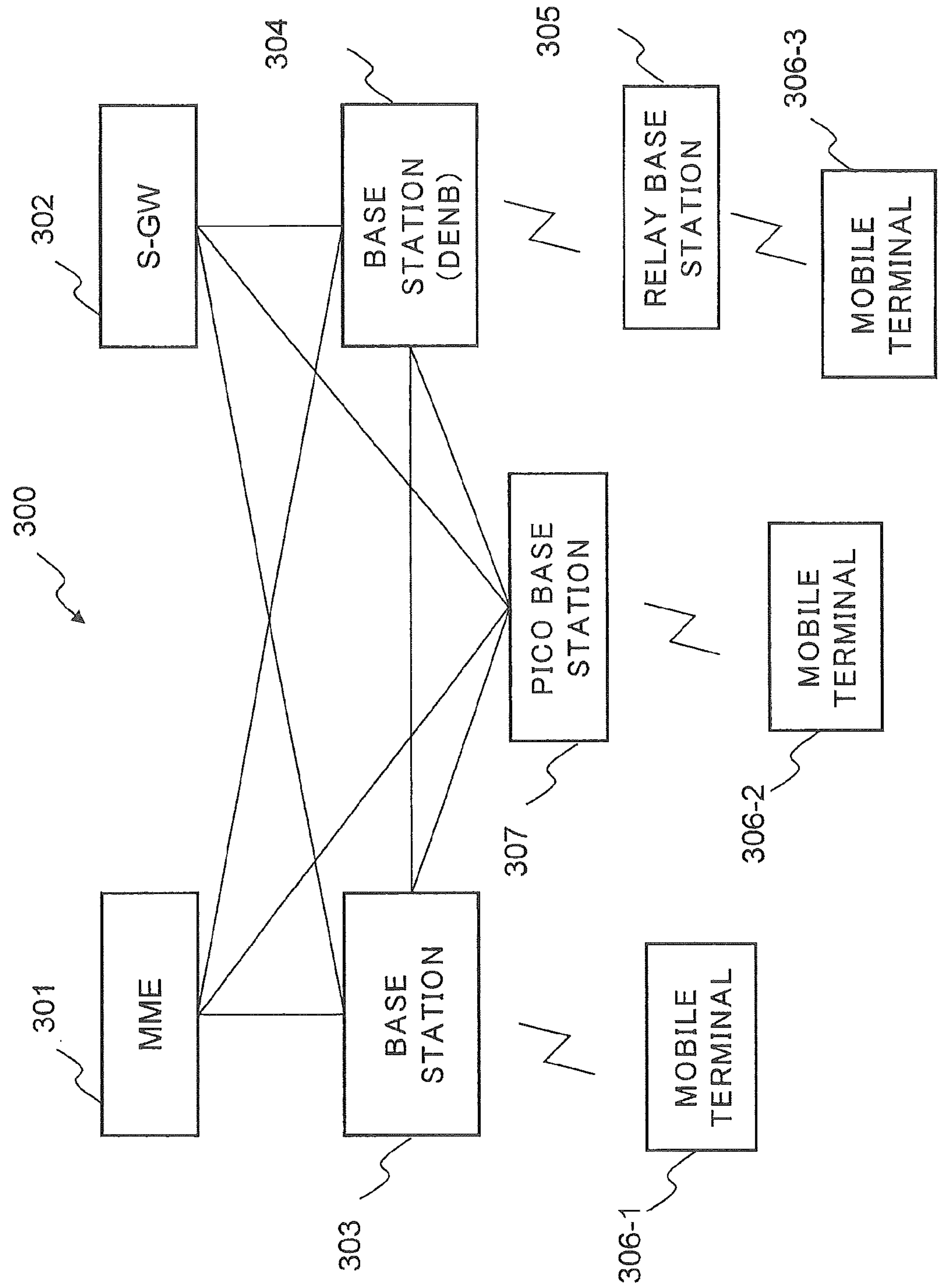
FIG. 3 is a block diagram which indicates an exemplary configuration of a communication system of a second exemplary embodiment.

FIG. 3 is a block diagram which indicates an exemplary configuration of a communication system 300 of the second exemplary embodiment. The communication system 300 includes a MME (Mobility Management Entity) 301, a S-GW (Saving-Gateway) 302, a base station 303 and a base station 304. The communication system 300 further includes a relay base station 305, a mobile terminal 306-1, a mobile terminal 306-2 and a mobile terminal 306-3.

The base station 303, the base station 304 and a pico base station 307 are connected to the MME 301 and the S-GW 302 via a network. Henceforth, when these base stations are not distinguished in particular, each of them is just called a "base station". Similarly, when the mobile terminal 306-1, the mobile terminal 306-2 and the mobile terminal 306-3 are not distinguished in particular, each of them is just called a "mobile terminal 306".

It is supposed that, in the example of FIG. 3, there are three pieces of the mobile terminal 306, and each of them is connected to the base station 303, the relay base station 305 and the pico base station 307, respectively.

Although the communication system 300 shown in FIG. 3 may be configured by any kind of network, description will be made taking a network using LTE (Long Term Evolution) as an example below.

The MME 301 has a function to transmit and receive a control signal to and from the base station via a S1-MME link. The S-GW 302 has a function to transmit and receive user data to and from the base station via a S1-U link.

Each base station performs management of a cell. Also, the base station can put the relay base station under control. In FIG. 3, the base station 304 puts the relay base station 305 under control. The base station 304 which puts the relay base station 305 under control is also called DeNB as mentioned above. The base stations are connected by a X2 link.

Although the pico base station 307 has the same function as the base station 303, its transmission power is small and its coverage is also small compared with the base station 303.

The base station 304 and the relay base station 305 are connected by a Un link. The base station has a forwarding function of the data between the MME 301 (or S-GW 302) and the relay base station 305. Data between the MME 301 (or S-GW 302) and the relay base station 305 is transmitted via a S11 link.

Although each device shown in FIG. 3 also has a large number of functions besides the ones mentioned above, description about their detailed functions will be omitted.

[Configurations of Base Station]

Figure 4:
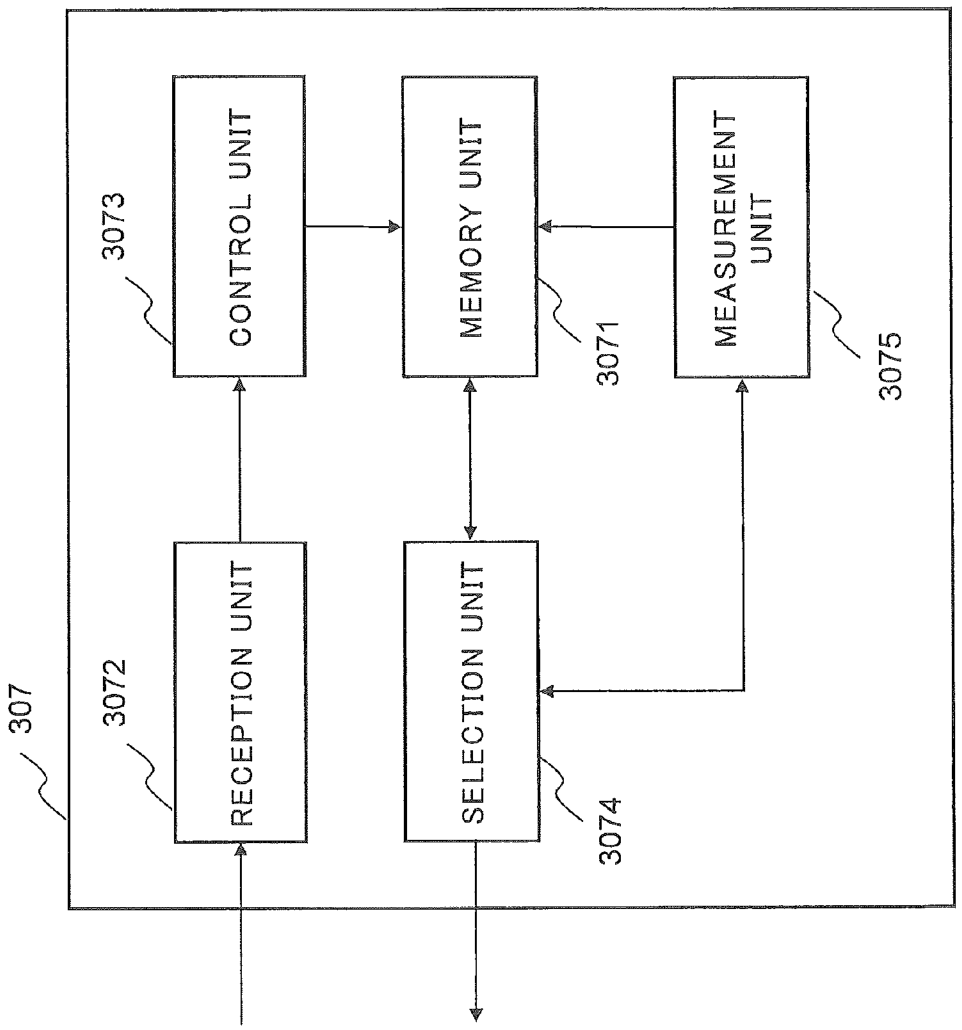
FIG. 4 is a block diagram which indicates an exemplary configuration of a pico base station shown in FIG. 3.

FIG. 4 is a block diagram which indicates an exemplary configuration of the pico base station 307. Incidentally, the configuration of FIG. 4 can also be applied to not only the pico base station 307 but also other ones of the base station 303, the base station 304 or the relay base station 305.

Henceforth, unless otherwise noted, a configuration and operations of the second exemplary embodiment will be described taking the pico base station 307 as an example. Incidentally, a configuration and operations of the second exemplary embodiment are not limited to the pico base station 307, and the configuration and operations can also be applied to the base station 303, the base station 304 or the relay base station 305. Although the pico base station 307 may manage a plurality of cells, description will be made supposing that the pico base station 307 manages one cell for simplification of description below.

The pico base station 307 includes a memory unit 3071, a reception unit 3072, a control unit 3073, a selection unit 3074 and a measurement unit 3075.

The memory unit 3071 stores an adjacent cell list of a cell which the pico base station 307 manages. An adjacent cell list is a list which indicates cells to be a candidate of a destination of handover from the pico base station 307 as mentioned above.

FIG. 5 is a diagram which indicates an example of an adjacent cell list to be stored in the memory unit 3071. In the example of FIG. 5, cells #a, #b, #c, #d, #f and #e are listed as adjacent cells. In the example of FIG. 5, the number of times of handover of each cell is associated with each cell. In the example of FIG. 5, each cell is lined in descending order of the number of times of handover, being given priority in this order.

Although the number of times of handover is being associated with each cell in FIG. 5, the number of times of handover is not required necessarily only if each cell is listed. Another piece of information other than the number of times of handover can be adopted, or other pieces of information can be added. For example, a success rate of handover and a rate of failure of handover and the like are cited.

Returning to description of FIG. 4, the reception unit 3072 receives from a base station adjacent to a cell which the pico base station 307 manages an adjacent cell list that the adjacent base station has.

The control unit 3073 employs the adjacent cell list of the other base station, which the reception unit 3072 has received, as an adjacent cell list of a cell which the pico base station 307 manages.

The selection unit 3074 selects a base station from which an adjacent cell list is received based on a state of the cell of the adjacent base station. The selection unit 3074 receives a state of the cell of an adjacent base station from an adjacent cell list of the memory unit 3071 or the measurement unit 3075.

The measurement unit 3075 measures information such as the number of times of handover or a rate of failure of handover of an adjacent cell, and outputs to the selection unit 3074 or the memory unit 3071.

[Operations]

Figure 6:
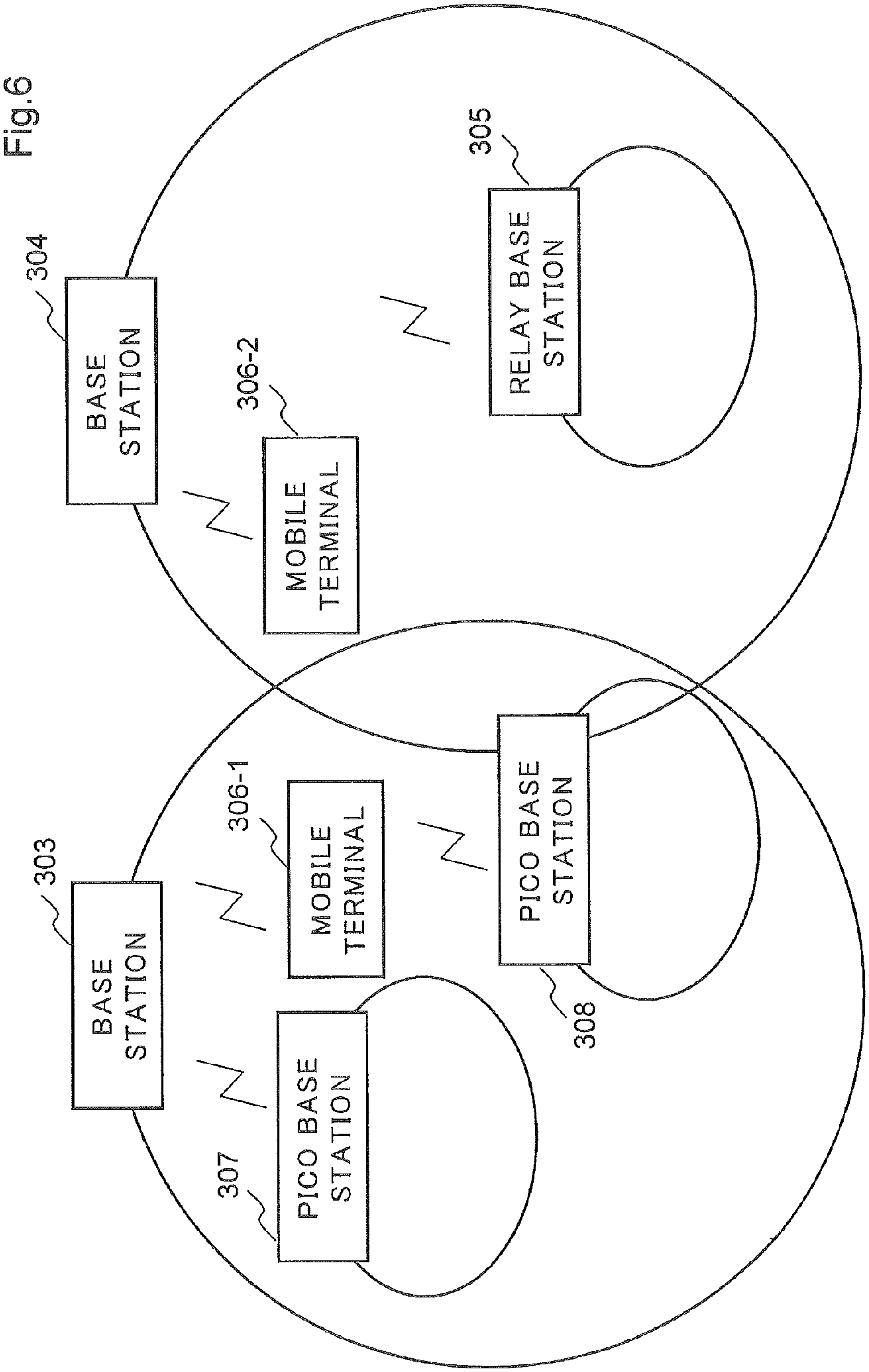
FIG. 6 is a diagram for illustrating relation between base stations (relation between cells of respective base stations) of the communication system of the second exemplary embodiment.

FIG. 6 is a diagram illustrating operations of the communication system 300 of the second exemplary embodiment, and, more particularly, is a diagram which indicates relation between the cells of the base station 303, the base station 304, the relay base station 305, the pico base station 307 and a pico base station 308, and the mobile terminal 306. Incidentally, the MME 301 and the S-GW 302 are being omitted for simplicity. Although each base station may possess a plurality of cells, it is supposed that each base station has one cell respectively in the example of FIG. 6.

In the example of FIG. 6, the mobile terminal 306-1, the pico base station 307 and the pico base station 308 are included in the cell of the base station 303. Similarly, the mobile terminal 306-2, the relay base station 305 and the pico base station 308 are included in the cell of the base station 304.

As mentioned above, coverage of the relay base station 305, the pico base station 307 and the pico base station 308 is respectively small as compared with coverage of the base station 303 or the base station 304. Accordingly, the number of cells listed in an adjacent cell list possessed by such base station also is inevitably small.

Accordingly, according to the second exemplary embodiment, a base station of a small coverage such as a pico base station and a relay base station receives an adjacent cell list from a base station of a larger coverage and uses the received adjacent cell list for an adjacent cell list of self.

For example, the pico base station 307 receives an adjacent cell list from the base station 303 having a cell including the pico base station 307. Similarly, the relay base station 305 receives an adjacent cell list from the base station 304 having a cell including the relay base station 305. The pico base station 308 included in both cells of the base station 303 and the base station 304 selects a base station from which an adjacent cell list is received between the base station 303 and the base station 304, and receives the adjacent cell list from the selected base station.

Figure 7:
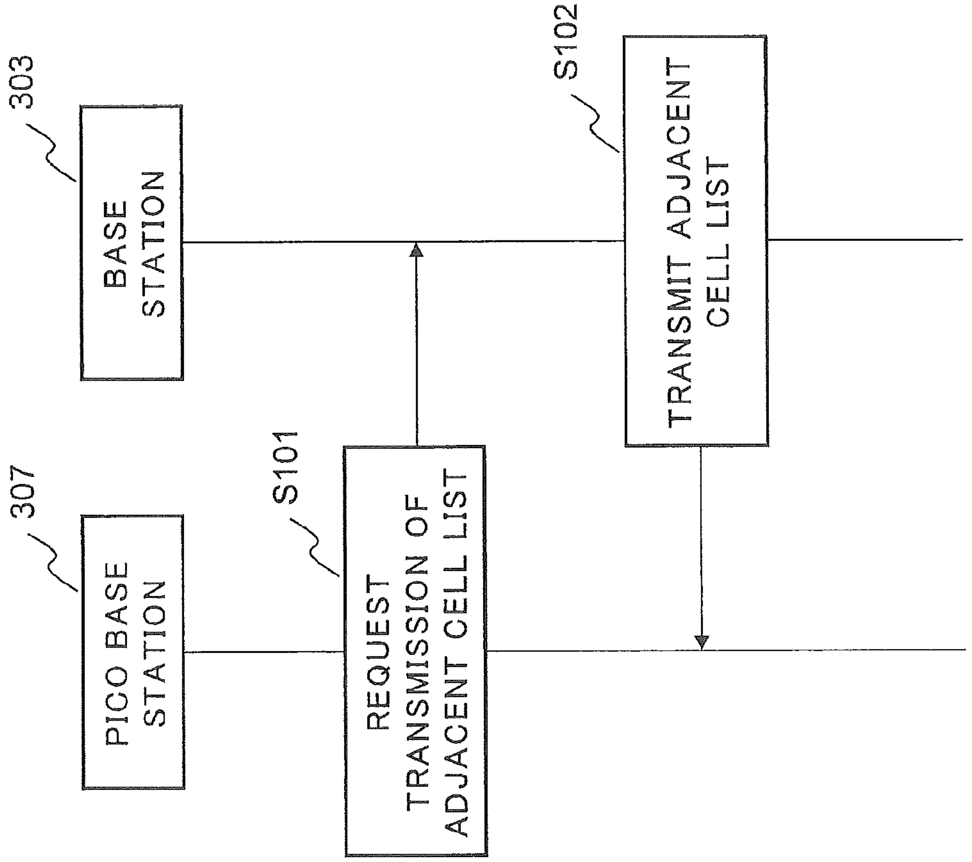
FIG. 7 is a sequence diagram for illustrating an operation of the pico base station to receive an adjacent cell list from the base station via an X2 link of the communication system of the second exemplary embodiment.

FIG. 7 is a sequence diagram illustrating operations of the communication system 300 of the second exemplary embodiment and, more particularly, operations by which the pico base station 307 receives an adjacent cell list from the base station 303 via a X2 link.

Taking a case where the pico base station 307 acquires an adjacent cell list from the base station 303 via a X2 link as an example, the operations of the pico base station 307 will be described using FIG. 7. It is supposed that the selection unit 3074 has selected the base station 303 as a base station from which an adjacent cell list is received. The selection unit 3074 requests transmission of an adjacent cell list to the selected base station 303 (Step S101). The base station 303 that has accepted the request transmits an adjacent cell list as well as information which indicates the size of the coverage of the base station 303 to the pico base station 307 (Step S102).

It is also possible for a certain base station to receive an adjacent cell list from a different base station via another communication device. As a communication device for relaying, the MME 30, a management apparatus of a network not illustrated and the like are cited, for example.

Figure 8:
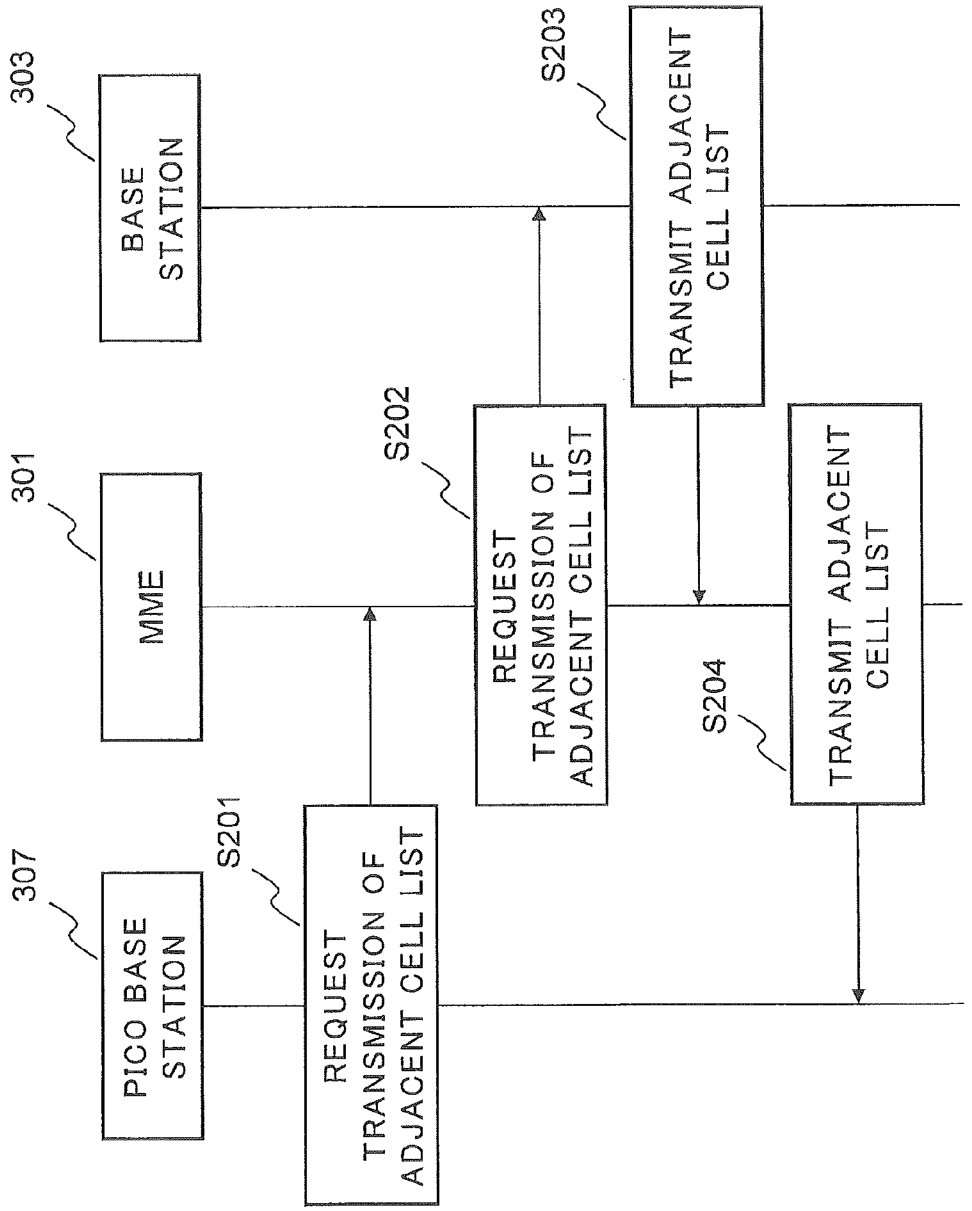
FIG. 8 is a sequence diagram for illustrating an operation of the pico base station to receive the adjacent cell list from the base station via a S1 link of the communication system of the second exemplary embodiment.

FIG. 8 is a sequence diagram illustrating operations of the communication system 300 of the second exemplary embodiment, and, more particularly, operations by which the pico base station 307 receives an adjacent cell list from the base station 303 via a S1 link.

The selection unit 3074 of the pico base station 307 requests transmission of an adjacent cell list to the MME 301 (Step S201). The MME 301 that has received this request transmits the request to the base station 303 (Step S202). Next, the base station 303 transmits an adjacent cell list as well as information which indicates the size of the coverage of the base station 303 to the MME 301 (Step S203). Next, the MME 301 transmits the adjacent cell list as well as the information which indicates the size of the coverage of the base station 303 to the pico base station 307 (Step S204).

Figure 9:
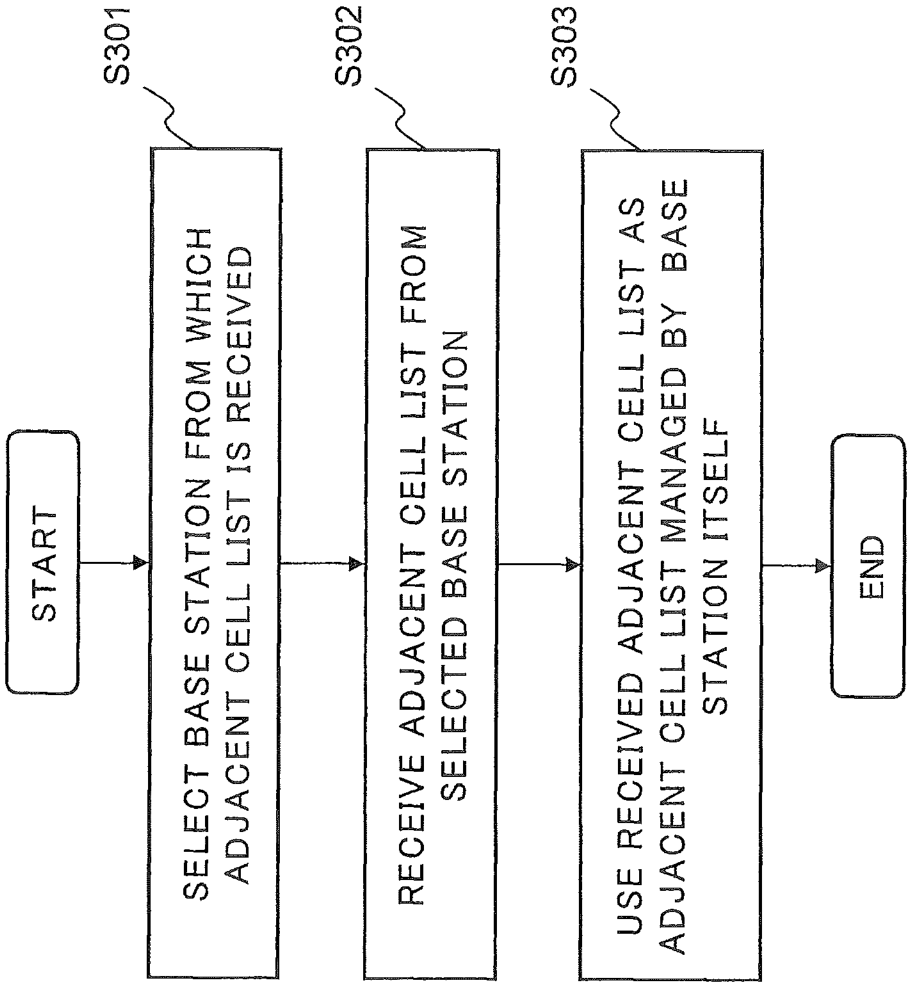
FIG. 9 is a flow chart for illustrating an example of basic operation of the pico base station included in the communication system of the second exemplary embodiment.

FIG. 9 is a flow chart illustrating an example of basic operation of the pico base station 307 shown in FIG. 4. The selection unit 3074 selects another base station from which an adjacent cell list is received (Step S301). The selection unit 3074 requests transmission of an adjacent cell list to the selected base station. The reception unit 3072 receives an adjacent cell list from the selected base station (Step S302). The control unit 3073 employs the received adjacent cell list as an adjacent cell list of the cell which the pico base station 307 manages (Step S303).

[Example of Concrete Operation of Pico Base Station]

Henceforth, example of concrete operation until the pico base station 307 receives an adjacent cell list of its managing cell will be described. Incidentally, because the pico base station 308 also performs similar operations, description of concrete operation of the pico base station 307 will be omitted.

First, by cell planning, cells of a near distance are inputted from geographic information or the like as initial values of an adjacent cell list of the pico base station 307.

The measurement unit 3075 measures the number of times of handover and a rate of failure of handover as statistical information about each cell of the initial adjacent cell list. The statistical information which the measurement unit 3075 has measured is stored in a table like FIG. 10.

In FIG. 10, as statistical information, the number of times of handover and a rate of failure of handover for each adjacent cell are included. Further, in FIG. 10, cells are placed in order of the number of times of handover from largest to smallest. As another piece of statistical information, a success rate of handover or the like may be used.

Next, the selection unit 3074 specifies a cell which includes the cell of the pico base station 307, or a cell with the largest overlap while referring to the table of FIG. 10. For example, it is thinkable that the pico base station 307 selects a cell having the largest number of times of handover and a rate of failure of handover less than a threshold value. When the threshold value of a rate of failure of handover is set to 10%, a cell which the pico base station 307 selects will be cell #b.

The selection unit 3074 requests via an X2 link or S1 link transmission of an adjacent cell list to the base station 303 that manages cell #b having been selected.

The base station 303 transmits the adjacent cell list of cell #b to the pico base station 307. Here, the base station 303 also transmits information which indicates the size of its coverage together. This information may be a unique identifier of a base station or an identifier that indicates the kind of a base station such as a pico base station and a relay base station.

Therefore, when assuming that a cell in which a transmission request for an adjacent cell list has been received is the cell of a pico base station or a relay base station, information which shows that the cell in which the transmission request is received is a cell with small coverage will be notified of at the time of transmitting the adjacent cell list.

In this case, it is also possible for the pico base station 307 that has received an adjacent cell list to make a decision not to use the received adjacent cell list. Because the number of cells adjacent to a cell of a small coverage is small, there is a possibility of omission of setting of an adjacent cell in the pico base station 307.

When the pico base station 307 does not use an adjacent cell list of a cell of the pico base station 308 or the relay base station 305, the following operations are performed. The pico base station 307 requests transmission of an adjacent cell list to cells in a list of statistical information about adjacent cells of a cell which the pico base station 307 manages in turn in the order of priority from the highest to lowest. The pico base station 307 repeats the operation until an adjacent cell list is received from a cell besides the cell of the pico base station 308 or the relay base station 305.

[Operations of Relay Base Station]

Next, operations until the relay base station 305 receives an adjacent cell list will be described in detail.

The relay base station 305 selects the DeNB connected with the relay base station 305. In the example of FIG. 3 and FIG. 6, the base station 304 is selected.

The relay base station 305 requests transmission of an adjacent cell list to the base station 304 via a Un link. The base station 303 transmits an adjacent cell list to the relay base station 305.

Above, the second exemplary embodiment has been described taking a pico base station and a relay base station as an example. However, even in the case of the base station 303 and the base station 304, for example, which are not a pico base station or a relay base station, the configuration and operations of the second exemplary embodiment are applicable. When the object of application about the configuration and operations is the base station 303, for example, it is possible to receive an adjacent cell list from the base station 304 and employ the received adjacent cell list as an adjacent cell list of a cell which it manages. Similarly, also in the case of a femto base station where coverage is smaller than a pico base station and a relay base station, the configuration and the operations of the second exemplary embodiment are also applicable.

[Effects]

In the second exemplary embodiment, communication performed between the pico base station 307 and an adjacent base station (the base station 303, for example) at the time of creating an adjacent cell list of the pico base station 307 is only reception of an adjacent cell list which the base station 303 manages and a transmission request of an adjacent cell list. That is, frequent communication like the patent document 1 and the patent document 2 is unnecessary. That is, according to the second exemplary embodiment, an adjacent cell list can be created without increasing communications traffic.

Third Exemplary Embodiment

Next, the third exemplary embodiment according to the present invention will be described. The third exemplary embodiment is different in a point that, in addition to the second exemplary embodiment, an adjacent cell list received from another base station is optimized. Incidentally, the third exemplary embodiment is common to the second exemplary embodiment in a point that a certain base station receives an adjacent cell list from another base station. Accordingly, description will be omitted appropriately about a part common to the second exemplary embodiment.

[Configurations]

Because the pico base station 307 according to the third exemplary embodiment is similar to the configuration of the pico base station 307 according to the second exemplary embodiment shown in FIG. 4, description will be omitted. Incidentally, as is the case with the second exemplary embodiment, the configuration and operations of the third exemplary embodiment are not limited to the pico base station 307, and the configuration and operations can also be applied to the base station 303, the base station 304 or the relay base station 305.

[Operations]

Figure 11:
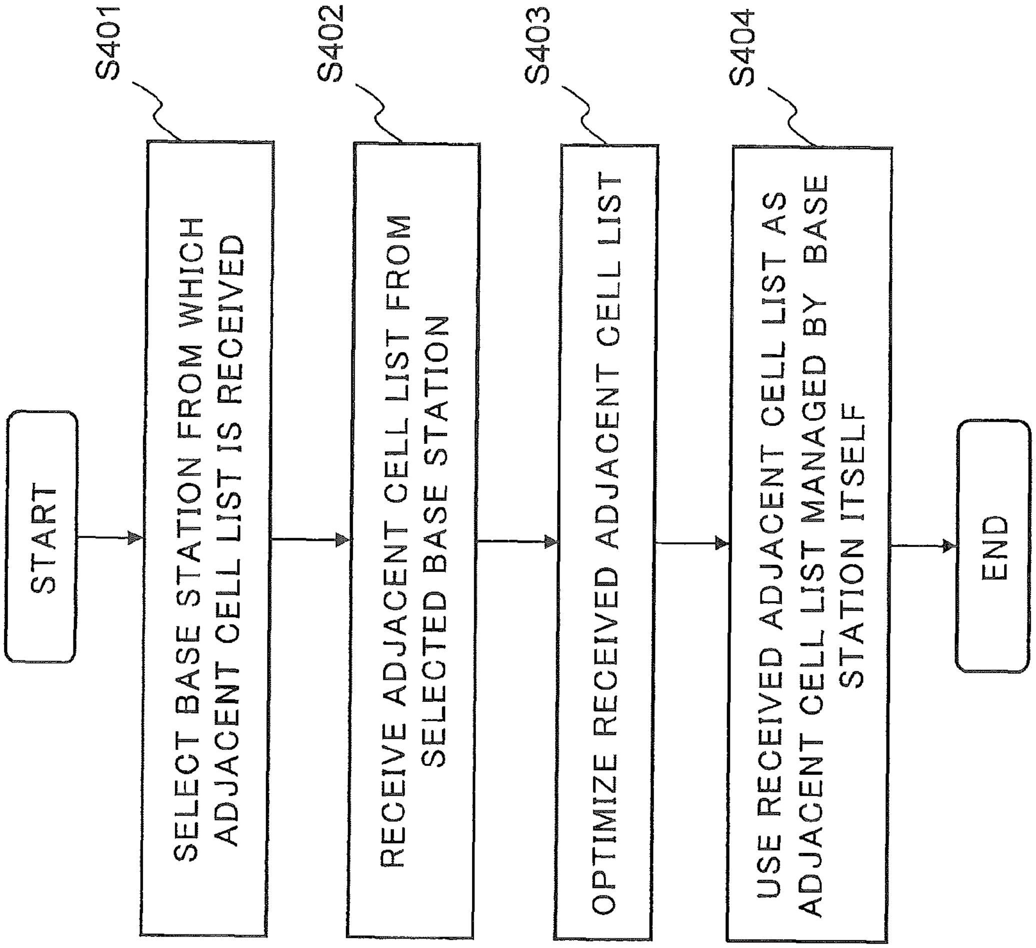
FIG. 11 is a flow chart for illustrating an example of operations of a pico base station of a communication system of a third exemplary embodiment.

Hereinafter, about operations by the third exemplary embodiment, description will be made with reference to FIG. 11 taking the pico base station 307 as an example. FIG. 11 is a flow chart illustrating an example of operations of the pico base station 307.

First, a selection unit 3074 selects another base station from which an adjacent cell list is received (Step S401). Here, it is supposed that the selection unit 3074 has selected the base station 303 as the base station from which an adjacent cell list is received. The selection unit 3074 requests transmission of an adjacent cell list to the selected base station 303.

Next, the reception unit 3072 receives an adjacent cell list from the selected base station (Step S402).

The above mentioned operations of Step S401 and Step S402 are similar to Step S301 and Step S302 of the operations of the second exemplary embodiment shown in FIG. 8, respectively.

When the reception unit 3072 receives an adjacent cell list in Step S402, the pico base station 307 performs the operation of Step S403. The control unit 3073 optimizes the received adjacent cell list. This optimization will be described in detail later.

Finally, the control unit 3073 employs the optimized adjacent cell list as an adjacent cell list of the cell which the pico base station 307 manages (Step S404).

[Optimization of Received Adjacent Cell List]

Figure 12:
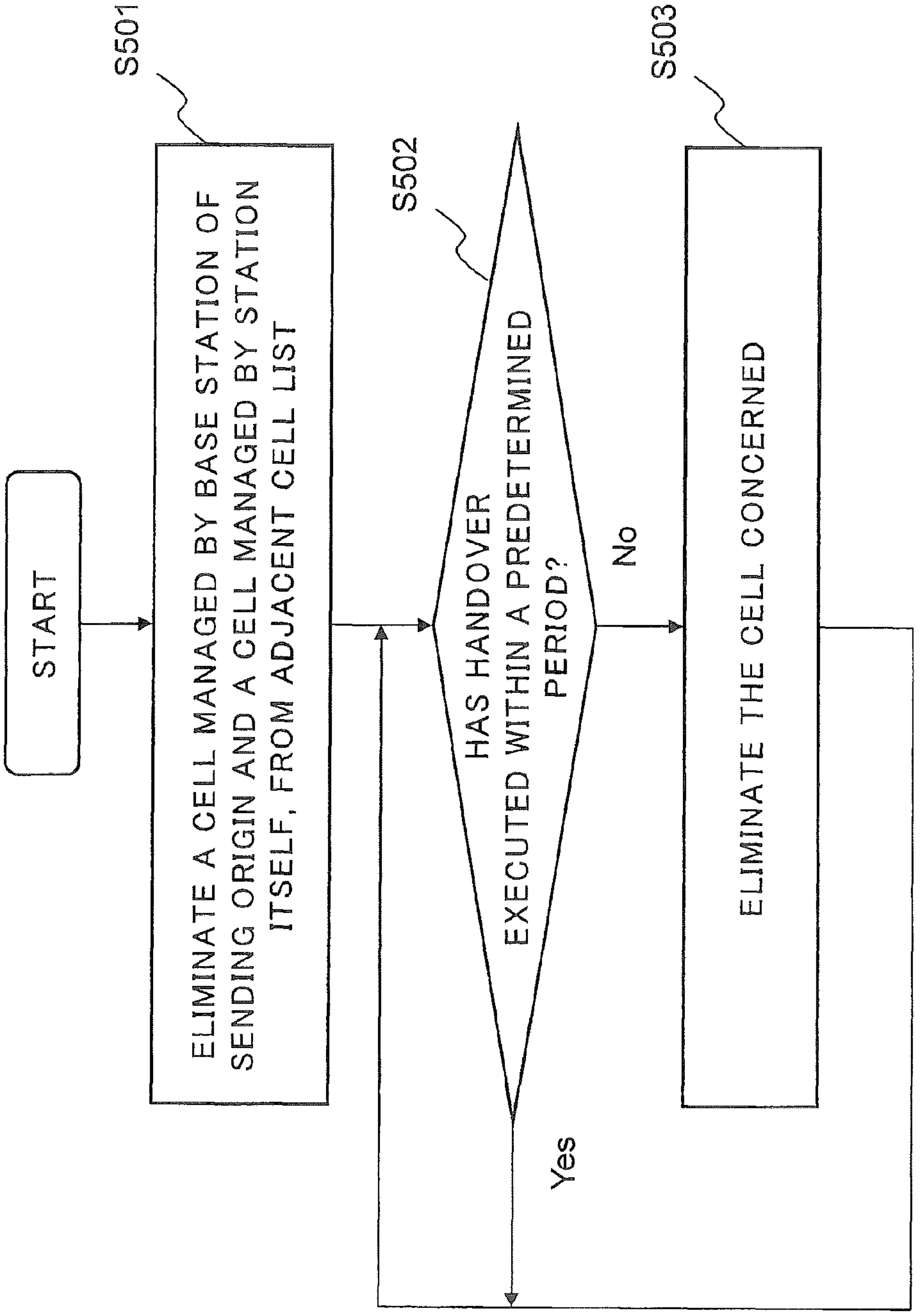
FIG. 12 is a flow chart for illustrating optimization processing of an adjacent cell list in a pico base station of the communication system of the third exemplary embodiment.

Hereinafter, optimization of a received adjacent cell list will be described with reference to the flow chart of FIG. 12. Below, description will be made taking a case where the pico base station 307 has received an adjacent cell list of cell #b which the base station 303 manages as an example.

First, the reception unit 3072 of the pico base station 307 receives the adjacent cell list of cell #b from the base station 303. At that time, cell #b is not listed in the adjacent cell list received from the base station 303 as a candidate destination of handover. Therefore, the control unit 3073 adds cell #b to the received adjacent cell list. The control unit 3073 eliminates a cell which the base station 303 (the base station of the sending origin) manages and a cell which the pico base station 307 (the base station itself) manages from the received adjacent cell list (Step S501). The pico base station 307 uses the adjacent cell list created in Step S501 as an adjacent cell list of the cell which the pico base station 307 manages.

After processing of Step S501, the measurement unit 3075 measures the number of times of handover to a cell listed in the adjacent cell list. As a result of the measurement, whether handover to a certain cell has occurred or not in a predetermined period is determined (Step S502).

As a result of Step S502, when handover to a certain cell has not occurred, the control unit 3073 eliminates the cell from the adjacent cell list (Step S503: No). In the case where handover to every cell in the adjacent cell list has occurred, the measurement unit 3075 continues measuring (step S503: Yes).

Although operations of the pico base station 307 have been described above, because similar operations are performed in the case of the relay base station 305, description will be omitted.

Incidentally, it is also possible to perform optimization of a received adjacent cell list using various methods besides the method mentioned above.

Above, the third exemplary embodiment has been described taking a pico base station and a relay base station as an example. However, even to the base station 303 and the base station 304, for example, which are not a pico base station or a relay base station, the configuration and operations of the third exemplary embodiment are applicable. In the case of the base station 303, for example, it is possible to receive an adjacent cell list from the base station 304, and employ the received adjacent cell list as an adjacent cell list of a cell which the base station 303 manages. Similarly, the configuration and the operations according to the third exemplary embodiment are also applicable in a femto base station where coverage is smaller than a pico base station and a relay base station.

[Effects]

As is the case with the second exemplary embodiment, according to the third exemplary embodiment, an adjacent cell list can be created without increasing communications traffic.

The pico base station 307 according to the third exemplary embodiment optimizes a received adjacent cell list so that it may become an adjacent cell list most suitable for a cell managed by the pico base station 307. Accordingly, even when there is only a little statistical information which can be obtained by the pico base station 307, the most suitable adjacent cell list can be created with a little amount of processing according to the surrounding environment, and, moreover, a rate of failure of handover can be reduced.

Incidentally, the functions that a base station, a pico base station and a relay base station in the third exemplary embodiment described above have can be realized by hardware or can be realized by a computer and a program executed on the computer. The program is provided in a manner recorded in a recording medium such as a magnetic disk and a semiconductor memory, and is read by the computer at the time of start of the computer. By thus controlling operations of the computer, and making the computer function as a base station, a pico base station and a relay base station in each of the above-mentioned exemplary embodiment, the computer is made to perform the processing mentioned above.

In addition, part of or the whole of the above-mentioned exemplary embodiments can also be described as, but not limited to, the following supplementary notes.

(Supplementary Note 1)

A base station, comprising:

a storage means for storing a list of cells adjacent to a cell managed by said base station;

a reception means for receiving a list stored in said adjacent base station from a base station adjacent to said base station; and a control means for employing said received list as a list of cells managed by said base station itself.

(Supplementary Note 2)

The base station according to supplementary note 1, wherein said control means optimizes said received list and employs said optimized list as the list of cells managed by said base station itself.

(Supplementary Note 3)

The base station according to supplementary note 1 or 2, wherein said base station further comprises a selection means for selecting a base station from which said list is received.

(Supplementary Note 4)

The base station according to supplementary note 3, wherein said selection means selects said base station from which said list is received based on the number of times of handover of the cell managed by said adjacent base station.

(Supplementary Note 5)

The base station according to supplementary notes 3 or 4, wherein said selection means selects said base station from which said list is received based on the success rate of handover of the cell managed by said adjacent base station.

(Supplementary Note 6)

The base station according to any one of supplementary notes 3-5, wherein said selection means selects said base station from which said list is received based on the rate of failure of handover of the cell managed by said adjacent base station.

(Supplementary Note 7)

The base station according to any one of supplementary notes 1 to 6, wherein said control means optimizes said received list by eliminating a cell managed by a base station of a sending origin of said list and a cell managed by said base station itself.

(Supplementary Note 8)

The base station according to any one of supplementary notes 1 to 7, wherein said control means carries out optimization of said list by eliminating from said list a cell without execution of handover during a predetermined period among cells in said list.

(Supplementary Note 9)

A communication system having a plurality of base stations, said base station comprising:

a storage means for storing a list of cells adjacent to a cell managed by said base station;

a reception means for receiving a list stored in said adjacent base station from a base station adjacent to said base station; and a control means for employing said received list as a list of cells managed by said base station itself.

(Supplementary Note 10)

The communication system according to supplementary note 9, wherein said control means optimizes said received list and employs said optimized list as the list of cells managed by said base station itself.

(Supplementary Note 11)

The communication system according to supplementary note 9 or 10, wherein said base station further comprises a selection means for selecting a base station from which said list is received.

(Supplementary Note 12)

The communication system according to supplementary note 11, wherein said selection means selects said base station from which said list is received based on the number of times of handover of the cell managed by said adjacent base station.

(Supplementary Note 13)

The communication system according to supplementary note 11 or 12, wherein said selection means selects said base station from which said list is received based on the success rate of handover of the cell managed by said adjacent base station.

(Supplementary Note 14)

The communication system according to any one of supplementary notes 11 to 13, wherein said selection means selects said base station from which said list is received based on the rate of failure of handover of the cell managed by said adjacent base station.

(Supplementary Note 15)

The communication system according to any one of supplementary notes 9 to 14, wherein said control means optimizes said received list by eliminating a cell managed by a base station of a sending origin of said list and a cell managed by said base station itself.

(Supplementary Note 16)

The communication system according to any one of supplementary notes 9 to 16, wherein said control means optimizes said list by eliminating from said list a cell without execution of handover during a predetermined period among cells in said list.

(Supplementary Note 17)

A communication method, comprising:

a step of receiving a list of cells adjacent to said adjacent base station from an adjacent base station; and a step of employing said received list as a list of cells managed by a base station itself.

(Supplementary Note 18)

The communication method according to supplementary note 17, said communication method further comprising:

a step of optimizing said received list; and said optimized list being employed as the list of cells managed by said base station itself.

(Supplementary Note 19)

The communication method according to supplementary note 17 or 18, said communication method further comprising:

a step of selecting a base station from which said list is received.

(Supplementary Note 20)

The communication method according to supplementary note 19, wherein said base station from which said list is received is selected based on the number of times of handover of the cell managed by said adjacent base station.

(Supplementary Note 21)

The communication method according to supplementary note 19 or 20, wherein said base station from which said list is received is selected based on the success rate of handover of the cell managed by said adjacent base station.

(Supplementary Note 22)

The communication method according to any one of supplementary notes 19 to 21, wherein said base station from which said list is received is selected based on the rate of failure of handover of the cell managed by said adjacent base station.

(Supplementary Note 23)

The communication method according to any one of supplementary notes 17 to 22, wherein said list is optimized by eliminating a cell managed by a base station of a sending origin of said received list and a cell managed by said base station itself.

(Supplementary Note 24)

The communication method according to any one of supplementary notes 17 to 23, wherein said list is optimized by eliminating from said list a cell without execution of handover during a predetermined period among cells in said list.

(Supplementary Note 25)

A program for making a computer execute:

processing to receive a list of cells adjacent to said adjacent base station from an adjacent base station; and processing to employ said received list as a list of cells managed by a base station itself.

(Supplementary Note 26)

The program according to supplementary note 25, said program further comprising:

processing to optimize said received list; and said optimized list being employed as the list of cells managed by said base station itself.

(Supplementary Note 27)

The program according to supplementary note 25 or 26, said program further comprising:

processing of selecting a base station from which said list is received.

(Supplementary Note 28)

The program according to supplementary note 27, wherein, said base station from which said list is received is selected based on the number of times of handover of the cell managed by said adjacent base station.

(Supplementary Note 29)

The program according to supplementary note 27 or 28, wherein, said base station from which said list is received is selected based on the success rate of handover of the cell managed by said adjacent base station.

(Supplementary Note 30)

The program according to any one of supplementary notes 27 to 29, wherein, said base station from which said list is received is selected based on the rate of failure of handover of the cell managed by said adjacent base station.

(Supplementary Note 31)

The program according to any one of supplementary notes 25 to 30, wherein said list is optimized by eliminating a cell managed by a base station of a sending origin of said received list and a cell managed by said base station itself.

(Supplementary Note 32)

The program according to any one of supplementary notes 25 to 31, wherein said list is optimized by eliminating from said list a cell without execution of handover during a predetermined period among cells in said list.

Although the present invention has been described with reference to exemplary embodiments above, the present invention is not limited to the above-mentioned exemplary embodiments. Various modifications which a person skilled in the art can understand within the scope of the present invention can be made in the composition and details of the present invention.

This application claims priority based on Japanese application Japanese Patent Application No. 2011-240398, filed on Nov. 1, 2011, the disclosure of which is incorporated herein in its entirety.

REFERENCE SIGNS LIST

300 Communication system
301 MME
302 S-GW
303 or 304 and 1000 Base station
305 Relay base station
306 Mobile terminal
307 and 308 Pico base station
1002 Reception unit
1003 Control unit
3071 Memory unit
3072 Reception unit
3073 Control unit
3074 Selection unit
3075 Measurement unit

What is claimed is:

1. A base station, comprising:

a reception unit which receives a first adjacent cell list from an adjacent base station, said first adjacent cell list being a list of cells adjacent to a cell managed by said adjacent base station; and a control unit which employs said first adjacent cell list as a second adjacent cell list, said second adjacent cell list being a list of cells adjacent to a cell managed by said base station itself; and a selection unit which selects a base station from which said first adjacent cell list is received based on information regarding handover of a cell managed by said adjacent base station.

2. The base station according to claim 1, wherein said information regarding handover comprises the number of times of handover of said cell managed by said adjacent base station.

3. The base station according to claim 1, wherein said information regarding handover comprises the rate of success of handover of said cell managed by said adjacent base station.

4. The base station according to claim 1, wherein said selection unit selects a base station from which said first adjacent cell list is received based on the rate of failure of handover of a cell manages by said adjacent base station.

5. The base station according to claim 1, wherein said control unit performs predetermined optimization processing to said first adjacent cell list and generates said second adjacent cell list.

6. The base station according to claim 5, wherein said optimization processing includes processing to eliminate a cell managed by a base station of a sending origin and a cell managed by said base station itself, from said first adjacent cell list.

7. The base station according to claim 1, wherein said selection unit selects the base station from which said first adjacent cell list is received based on the information regarding handover comprises a quantitative feature of the handover of said cell managed by said adjacent base station.

8. A communication system having a plurality of base stations, at least one base station among said plurality of base stations comprising:

a reception unit which receives a first adjacent cell list from an adjacent base station, said first adjacent cell list being a list of cells adjacent to a cell managed by said adjacent base station;

a control unit which employs said first adjacent cell list as a second adjacent cell list, said second adjacent cell list being a list of cells adjacent to a cell managed by said base station itself; and a selection unit which selects a base station from which said first adjacent cell list is received based on information regarding handover of a cell managed by said adjacent base station.

9. A communication method, comprising:

receiving a first adjacent cell list from an adjacent base station, said first adjacent cell list being a list of cells adjacent to a cell managed by said adjacent base station;

employing said first adjacent cell list as a second adjacent cell list, said second adjacent cell list being a list of cells adjacent to a cell managed by said base station itself; and selecting a base station from which said first adjacent cell list is received based on information regarding handover of a cell managed by said adjacent base station.

10. A non-transitory computer-readable medium storing a program for making a computer of a base station carry out the communication method of claim 9.

* * * * *